Figure 1:
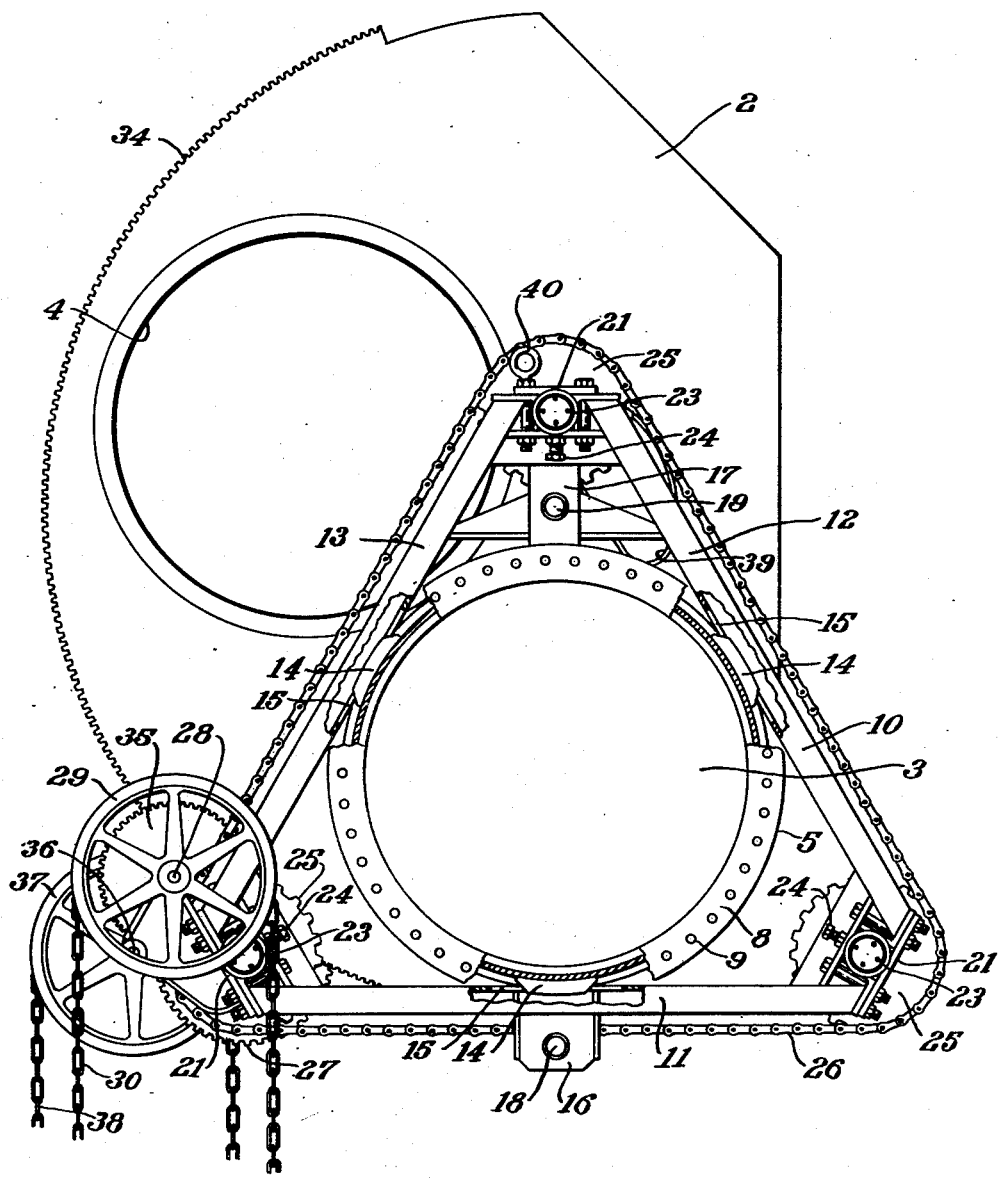

May 3, 1955

C. J. WESTLING 2,707,494

VALVE CONSTRUCTION

Filed June 7, 1951

2 Sheets-Sheet 1

INVENTOR
Carl J. Westling
by Hoopes, Leonard & Glenn
his attorneys

May 3, 1955  C. J. WESTLING  2,707,494
VALVE CONSTRUCTION
Filed June 7, 1951  2 Sheets-Sheet 2

INVENTOR
Carl J. Westling

United States Patent Office 2,707,494
Patented May 3, 1955

2,707,494

VALVE CONSTRUCTION

Carl J. Westling, West Orange, N. J., assignor to Vulcan Research Corporation, Pittsburgh, Pa., a corporation of Pennsylvania Application June 7, 1951, Serial No. 230,333

8 Claims. (Cl. 138—94.5)

This invention relates to valve construction. It relates especially to the construction and operation of valves of the type having peripherally closed seat members movable generally axially between open and closed positions.

Examples of valves to which my invention is applicable are plate valves employing a sliding or swinging plate or valve member movable between a position across a conduit in which it is adapted to prevent flow of fluid through the conduit and a position in which fluid flow through the conduit is permitted. The valve member may be either an imperforate plate disposed across the conduit when operative and disposed in a position remote from the conduit when inoperative or a plate having an imperforate portion disposed across the conduit when the valve is closed and a perforate portion adapted to be aligned with the conduit when the valve is open, such a valve being commonly termed a goggle valve. In each case the valve construction normally comprises peripherally closed seat members applied to the conduit generally coaxially therewith, the seat members partaking of limited movement generally axially of the conduit between inoperative positions in which they are relatively remote from each other and operative positions in which they are relatively close together. When operative the seat members engage a valve plate when the valve is closed and either directly engage each other or engage a valve plate having an opening therein aligned with the conduit when the valve is open. Means are provided for moving the seat members generally axially of the conduit between their operative and inoperative positions.

Valves of the type above referred to are generally of large size, being normally used in conduits having a diameter of several feet. The conduit with which the valve is used may be employed for transmitting hot gases such as blast furnace flue gases. The combined effect of the large size of the valve and the temperature conditions to which it is subjected in use render the parts subject to some warpage. When the seat members are closed either against a valve plate or against each other the warpage may inhibit proper sealing.

I have devised improvements in valves of the type above referred to which insure improved operation and sealing of the seat members even under adverse conditions of temperature and stress. I provide valve construction comprising a peripherally closed seat member adapted to be applied to a conduit generally coaxially therewith and movable generally axially of the conduit to seat against a cooperating member, an impelling member for thus moving the seat member, the impelling member being separate from the seat member but engaging the seat member so that deflections of the impelling member will not be transmitted to the seat member, and means for moving the impelling member generally axially of the conduit. It is to be borne in mind that while normally both of the two opposed peripherally closed seat members are moved it is possible to employ one stationary seat member and one movable seat member. My invention is applicable to the mounting and operation of both seat members when both are movable and to the mounting and operation of the movable seat member when one seat member is stationary and the other is movable. The provision of an impelling member separate from the seat member whereby deflections of the impelling member will not be transmitted to the seat member insures proper seating of the seat member despite any deflection of the impelling member when applying pressure to the seat member when forcing it into operative position. Virtually uniform load distribution about the seat member is thereby accomplished without seat distortion or possible leakage due to such distortion.

The impelling member preferably generally surrounds the seat member and engages the seat member at spaced locations on the seat member. Means are preferably provided outside the seat member for guiding the impelling member for movement generally axially of the conduit. Means are also preferably provided outside the seat member for moving the impelling member generally axially of the conduit. The guide means preferably extend generally parallel to the axis of the conduit and engage the impelling member. The means for moving the impelling member generally axially of the conduit preferably act on the impelling member at spaced locations about the seat member. The impelling member preferably has seat member engaging portions disposed in generally tangential relation to the seat member.

The impelling member is preferably of generally polygonal form and is preferably disposed generally about the seat member so that portions thereof engage the seat member at spaced locations on the seat member. The means for moving the impelling member generally axially of the conduit are preferably disposed at the apices of the impelling member. Means are preferably provided for synchronously operating such means.

In a preferred form the impelling member is generally in the form of a triangular frame disposed about the seat member with portions of the sides of the triangular frame engaging the seat member. Desirably the impelling member and seat member have interengaging portions. The seat member may have generally radially projecting portions interengaging with the sides of the impelling member. Such generally radially projecting portions on the seat member may be in the form of lugs entering slots in the impelling member.

The seat member and impelling member are assembled by disposing the impelling member generally about the seat member and then relatively turning the seat member and impelling member to interengage the cooperating portions thereof. Means are preferably provided for maintaining the seat member and the impelling member against inadvertent relative turning movement after they have been thus assembled. A connection is preferably effected between the seat member and the impelling member after assembly thereof, which connection in addition to maintaining the seat member and impelling member against inadvertent relative turning movement also preferably transmits a portion of the load of the impelling member to the seat member but without transmitting deflections of the impelling member to the seat member. In this way the load of the impelling member is distributed about the seat member and effective and tight sealing contact between seat member and valve member is facilitated.

The impelling member may be guided for movement generally axially of the conduit by a guide pin disposed outside the seat member extending generally parallel to the axis of the conduit. A plurality of guide pins may be employed. The valve plate may be pivoted on one guide pin. Each guide pin may be connected with one impelling mmeber and disposed in guiding relationship with respect to the other impelling member. Thus a highly reliable easily operable valve construction is provided which at the same time has relatively long life and is inexpensive to maintain.

Other details, objects and advantages of the invention will become apparent as the following description of a present preferred embodiment thereof proceeds.

Figure 2:
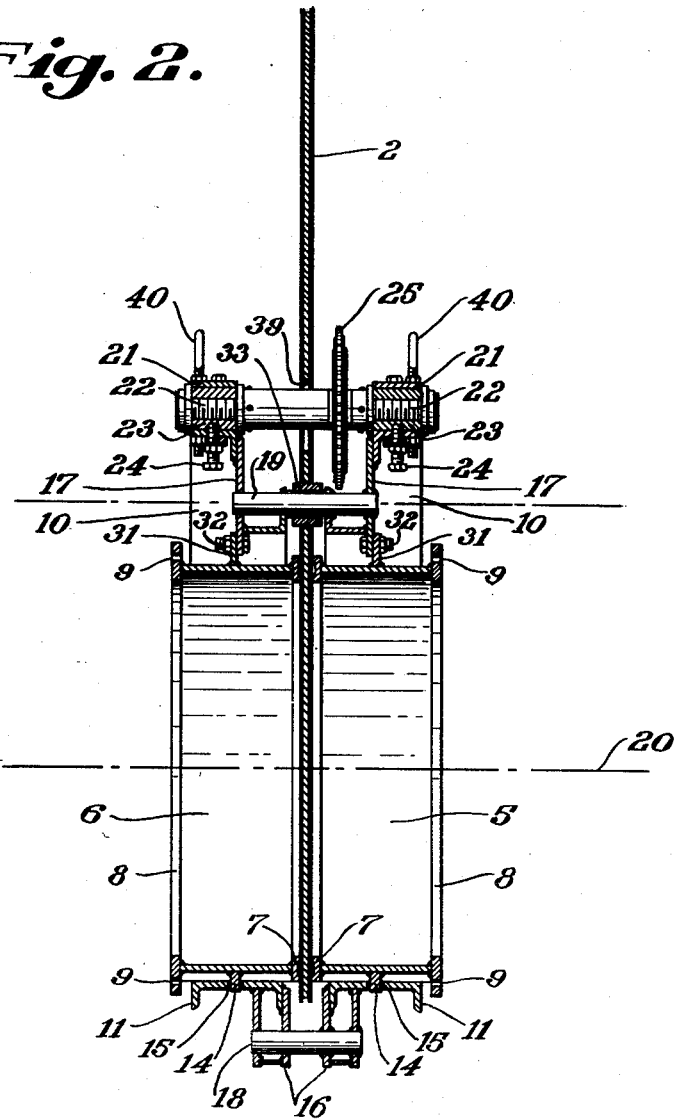

In the accompanying drawings I have shown a present preferred embodiment of the invention in which Figure 1 is a face view of a valve construction; and Figure 2 is a vertical transverse cross-sectional view through the valve construction shown in Figure 1.

Referring now more particularly to the drawings, the valve construction comprises a valve member or valve element proper in the form of a plate 2 shown as a goggle plate having an imperforate portion 3 adapted to be aligned with the conduit with which the valve is used when flow of fluid through the conduit is to be prevented and a perforate portion 4 adapted to be aligned with the conduit when flow of fluid through the conduit is to be permitted. The mounting and operation of the valve plate 2 will be presently described.

The valve comprises opposed seat members 5 and 6. The seat members 5 and 6 are identical. Each of them is of generally annular or drum shape having a sealing face 7 disposed toward the valve plate and a flange 8 disposed away from the valve plate. Each of the seat members 5 and 6 is adapted to be applied to a conduit generally coaxially thereof by having its flange 8 disposed in face-to-face relation with a flange of the conduit and suitably sealed and fastened thereto. The seat members may be fastened to the conduit by bolts or other fastening means passing through spaced bolt holes 9 in the flanges 8 and through aligned holes in the conduit flanges.

An impelling member designated generally by reference numeral 10 is provided for each of the seat members 5 and 6. Each of the impelling members 10 is in the form of a generally triangular frame. In the form shown each impelling member 10 is in the form of an equilateral triangle with one of its sides disposed at the bottom and generally horizontally. The bottom generally horizontal side of each impelling member 10 is designated 11. The other two sides of each impelling member are designated respectively 12 and 13.

Each impelling member 10 is disposed generally about one of the seat members with the sides of the impelling member in generally tangential relation to the seat member. Means are provided whereby the impelling members may operate the seat members but without transmitting deflections of the impelling members to the seat members. The sides of the triangular impelling members have means interengaging with the seat members. In the form shown each seat member is shown as having welded to its exterior three radially outwardly projecting lugs 14. The lugs 14 are spaced apart at angular intervals of 120° about the periphery of the seat member. Their shape is shown in Figure 1. Each lug 14 is adapted to enter a slot 15 in one of the sides of the corresponding impelling member 10 as clearly shown in Figure 2. Thus each of the triangular impelling members 10 has engagement with the corresponding seat member 5 or 6 only at three spaced locations about the seat member so that while the impelling member can move the seat member generally axially of the conduit deflections of the impelling member will not be transmitted to the seat member.

Each of the impelling members 10 has a downward projection 16 and an upward projection 17. A guide pin 18 is welded to the downward projection 16 of one of the impelling members 10 and has a sliding fit in the downward projection 16 of the other impelling member 10. A guide pin 19 is welded to the upward projection 17 of one of the impelling members 10 and has a sliding fit in the upward projection 17 of the other impelling member 10. The guide pins 18 and 19 extend parallel to the axis of the conduit, which axis is indicated at 20 and is of course also the axis of the seat members 5 and 6. Thus the impelling members 10 are guided by the pins 18 and 19 for relative movement generally axially of the conduit.

At each of the three apices of each of the impelling members 10 is a clamp or jack mechanism which in the preferred form comprises a sleeve 21 which embraces a nut of a differential screw mechanism for relatively moving the impelling member 10 generally axially of the conduit. At each apex there is a screw 22 having at its opposite ends threaded portions of the same hand but different lead, a nut 23 being applied to each such threaded portion and one of the sleeves 21 surrounding each nut 23. Each of the differential screw mechanisms may be of any suitable construction; I prefer to employ the construction shown in my copending application Serial No. 230,331 filed June 7, 1951, now Patent No. 2,606,454. As each screw 22 turns, the nuts 23 at the respective ends thereof, which are held against turning by studs 24, are caused to move slightly toward or away from each other since the threads are of different lead. But, since the sleeves 21 are disposed about the respective nuts 22 and maintained against axial movement relatively to the nuts, movement of the nuts toward or away from each other causes movement of the impelling members 10 toward or away from each other. To insure synchronous operation of the three differential screw mechanisms a sprocket 25 is fastened to each of the three screws and a sprocket chain 26 extends about the impelling member and meshes with the three sprockets. Thus when the sprocket chain moves in one direction about the impelling member that member is caused to move toward the other impelling member and when the sprocket chain moves in the opposite direction it is caused to move away from the other impelling member.

Fastened to the lower left-hand screw 22 viewing Figure 1 is a gear 27 which meshes with a pinion loose on a shaft 28. Integral with that pinion is a gear 35 which meshes with a pinion fixed to a shaft 36. Also fixed to the shaft 36 is a chain wheel 37 with which meshes a chain 38 which hangs down to be manually operated from the floor. Pulling downwardly of one reach of the chain 38 moves the impelling members 10 relatively toward each other and pulling downwardly of the other reach of the chain 38 moves the impelling members 10 relatively away from each other. Movement of the impelling members brings about a corresponding movement of the seat members but due to the connections between the impelling members and the seat members as described above the seat members are positively moved toward or away from each other as the case may be but any deflection occurring in the impelling members is not transmitted to the seat members which are free to properly seat themselves against each other or against the valve plate as the case may be. The seat members are of course moved apart when the position of the valve plate is to be changed and are moved toward each other when the valve plate has been moved to its new position to effect a seal either against the valve plate or against each other as the case may be.

In assembling each seat member and the corresponding impelling member the impelling member is disposed generally about the seat member with the lugs 14 offset angularly from the slots 15 whereupon the seat member and the impelling member are relatively turned to bring the lugs 14 into the slots 15. Each seat member has a relatively thin lug 31 welded thereto and projecting upwardly therefrom, which lug 31 is bolted by a bolt 32 to a portion of the upward projection 17 of the corresponding impelling member 10. The purpose of this connection is to maintain the seat member and impelling member against inadvertent relative turning movement after they have been assembled. Also the connection transmits a portion of the load of the impelling member to the seat member but without transmitting deflections of the impelling member to the seat member. The holes for the bolt 32 may be oversize to enable the connection to perform its functions as above described without transmitting deflections from the impelling member to the seat member.

The valve plate 2 has a hub 33 through which the pin 19 passes so that the valve plate is mounted for turning movement upon the pin 19. The valve plate 2 has at its edge a circular rack 34 which meshes with a pinion fixed to the shafts 28. Also fixed to the shaft 28 is a chain wheel 29 with which meshes a chain 30 which hangs down to be manually operated from the floor. Pulling downwardly of one reach of the chain 30 turns the valve plate 2 in one direction about the axis of the pin 19 and pulling downwardly of the other reach of the chain 30 turns the valve plate 2 in the opposite direction about the axis of the pin 19. Thus the chain 30 is used for moving the valve plate 2 between operative and inoperative positions when the seat members have first been separated by the mechanism above described.

The valve plate 2 has therethrough an opening 39 through which the upper screw 22 passes, the opening being shaped to accommodate the screw as the valve plate moves between open and closed positions. Eyes 40 for holding the impelling members 10 by means of an overhead crane are provided to facilitate erection of the structure.

While I have shown and described a present preferred embodiment of the invention it is to be distinctly understood that the invention is not limited thereto but may be otherwise variously embodied within the scope of the following claims.

I claim:

1. Valve construction comprising a peripherally closed seat member adapted to be applied to a conduit generally coaxially therewith and movable generally axially of the conduit to seat against a cooperating member, an impelling member for thus moving the seat member and subject to deflections when so doing, the impelling member being a separate and distinct member from the seat member but engaging the seat member so that deflections of the impelling member will not be transmitted to the seat member, and means engaging the impelling member for moving the impelling member generally axially of the conduit.

2. Valve construction comprising a peripherally closed seat member adapted to be applied to a conduit generally coaxially therewith and movable generally axially of the conduit to seat against a cooperating member, an impelling member for thus moving the seat member and subject to deflections when so doing, the impelling member being a separate and distinct member from the seat member and having seat member engaging portions disposed in generally tangential relation to the seat member but engaging the seat member at spaced locations on the seat member so that deflections of the impelling member will not be transmitted to the seat member and means for moving the impelling member generally axially of the conduit.

3. Valve construction comprising a peripherally closed seat member adapted to be applied to a conduit generally coaxially therewith and movable generally axially of the conduit to seat against a cooperating member, an impelling member for thus moving the seat member and subject to deflections when so doing, the impelling member being a separate and distinct member from the seat member and having generally polygonal form and being disposed generally about the seat member so that portions thereof engage the seat member at spaced locations on the seat member so that deflections of the impelling member will not be transmitted to the seat member and means engaging the impelling member for moving the impelling member generally axially of the conduit.

4. Valve construction comprising a peripherally closed seat member adapted to be applied to a conduit generally coaxially therewith and movable generally axially of the conduit to seat against a cooperating member, an impelling member for thus moving the seat member and subject to deflections when so doing, the impelling member being a separate and distinct member from the seat member, the impelling member and seat member having interengaging portions whereby the impelling member moves the seat member without transmitting deflections of the impelling member to the seat member and means engaging the impelling member for moving the impelling member generally axially of the conduit.

5. Valve construction comprising a peripherally closed seat member adapted to be applied to a conduit generally coaxially therewith and movable generally axially of the conduit to seat against a cooperating member, an impelling member for thus moving the seat member and subject to deflections when so doing, the impelling member being a separate and distinct member from the seat member and having generally polygonal form and being disposed generally about the seat member, the seat member having generally radially projecting portions interengaging with the sides of the impelling member whereby the impelling member moves the seat member without transmitting deflections of the impelling member to the seat member and means engaging the impelling member for moving the impelling member generally axially of the conduit.

6. Valve construction comprising a peripherally closed seat member adapted to be applied to a conduit generally coaxially therewith and movable generally axially of the conduit to seat against a cooperating member, an impelling member for thus moving the seat member and subject to deflections when so doing, the impelling member being a separate and distinct member from the seat member and having generally polygonal form and being disposed generally about the seat member, the seat member and the sides of the impelling member having interengaging portions whereby the impelling member moves the seat member without transmitting deflections of the impelling member to the seat member, the seat member and impelling member being assemblable by disposing the impelling member generally about the seat member and then relatively turning the seat member and impelling member to interengage said portions thereof, means engaging the seat member and impelling member for maintaining the seat member and impelling member against inadvertent relative turning movement after they have been thus assembled and means engaging the impelling member for moving the impelling member generally axially of the conduit.

7. Valve construction comprising a pair of aligned peripherally closed seat members adapted to be applied to a conduit generally coaxially therewith and relatively movable generally axially of the conduit, a pair of impelling members, one for each of the seat members, for thus moving the seat members and subject to deflections when so doing, the impelling members being separate and distinct members from the seat members but engaging the seat members so that deflections of the impelling members will not be transmitted to the seat members, and means engaging the impelling members for relatively moving the impelling members generally axially of the conduit.

8. Valve construction comprising a pair of aligned peripherally closed seat members adapted to be applied to a conduit generally coaxially therewith and relatively movable generally axially of the conduit, a pair of impelling members, one for each of the seat members, for thus moving the seat members and subject to deflections when so doing, each of the impelling members having generally polygonal form and being a separate and distinct member from but disposed generally about one of the seat members, each seat member and the sides of the cooperating impelling member having interengaging portions whereby the impelling member moves the seat member without transmitting deflections of the impelling member to the seat member, each cooperating seat member and impelling member being assemblable by disposing the impelling member generally about the seat member and then relatively turning the seat member and impelling member to interengage said portions thereof, means for maintaining each cooperating seat member and impelling member against inadvertent relative turning movement after they have been thus assembled, means at the apices of the impelling members engaging the impelling members for relatively moving the impelling members generally axially of the conduit and means engaging said last mentioned means for synchronously operating said last mentioned means.

References Cited in the file of this patent

UNITED STATES PATENTS

| | | |
|---|---|---|
| 1,678,867 | McGee | July 31, 1928 |
| 1,842,056 | Westling | Jan. 19, 1932 |
| 1,967,695 | Westling | July 24, 1934 |
| 2,011,767 | Juengling | Aug. 20, 1935 |
| 2,299,124 | Boyton et al. | Oct. 20, 1942 |